United States Patent [19]
Fujihara

[11] Patent Number: 5,870,355
[45] Date of Patent: Feb. 9, 1999

[54] CD-ROM DEVICE CAPABLE OF REPRODUCING BOTH AUDIO DATA AND COMPUTER DATA

[75] Inventor: Shinobu Fujihara, Yamato, Japan

[73] Assignee: International Business Machines Corporation, Armonk, N.Y.

[21] Appl. No.: 876,950

[22] Filed: Jun. 17, 1997

[30] Foreign Application Priority Data

Jul. 25, 1996 [JP] Japan .................................. 8-196204

[51] Int. Cl.[6] .................................................. G11B 17/22
[52] U.S. Cl. ......................................................... 369/32
[58] Field of Search ................................ 369/32, 33, 58, 369/50, 47, 48, 54, 59

[56] References Cited

U.S. PATENT DOCUMENTS

| | | | |
|---|---|---|---|
| 4,802,152 | 1/1989 | Markvoort et al. | 369/32 |
| 5,199,019 | 3/1993 | Matsumura et al. | 369/60 |
| 5,257,254 | 10/1993 | Kutaragi | 369/32 |
| 5,420,839 | 5/1995 | Tateshi | 369/32 |

FOREIGN PATENT DOCUMENTS

| | | |
|---|---|---|
| 0440224A2 | 1/1991 | European Pat. Off. . |
| 0495518A1 | 1/1992 | European Pat. Off. . |
| 0552806A2 | 1/1993 | European Pat. Off. . |
| 0626690A1 | 5/1994 | European Pat. Off. . |
| 0708443A2 | 10/1995 | European Pat. Off. . |
| WO 91/18345 | 5/1991 | WIPO . |

Primary Examiner—Tan Dinh
Attorney, Agent, or Firm—Douglas R. Millett

[57] ABSTRACT

A CD-ROM device has an audio data buffer and a computer data buffer. The audio data is read into the audio data buffer at a speed higher than required for audio playback. The audio data may then be accessed at the normal audio playback speed. The audio data buffer is then replenished at certain time intervals. During the remaining time periods, computer data may be accessed and placed in the computer data buffer.

6 Claims, 10 Drawing Sheets

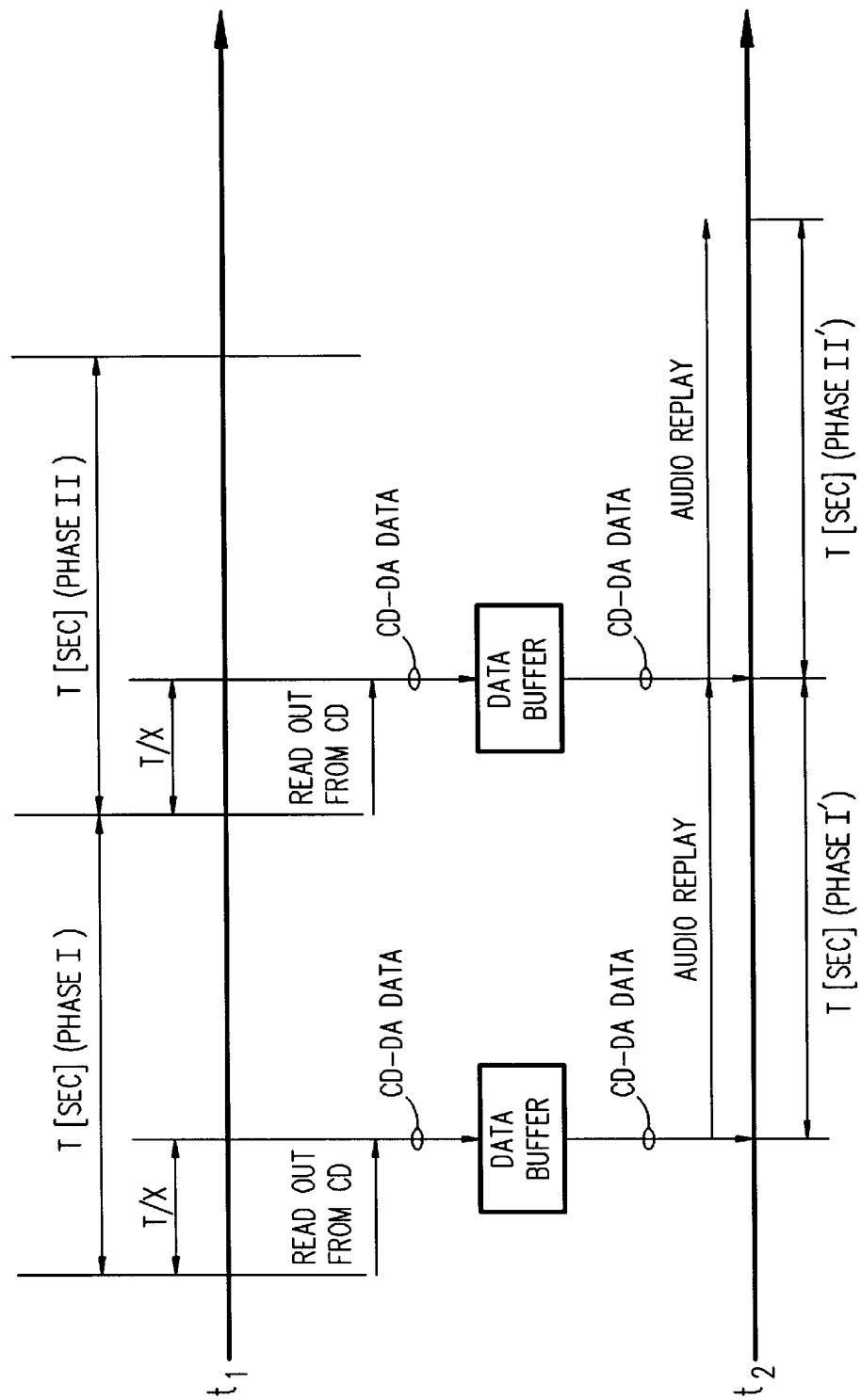

| PSEC | DISK TYPE |
|---|---|
| 00h | CD-DA TRACK OR CD-ROM TRACK |
| 10h | CD-I DISK |
| 20h | CD ROM XA DISK |

FIG. 11

| CONTROL | TYPE OF TRACK |
|---|---|
| 00x0<br>00x1<br>10x0<br>10x1 | CD-DA TRACK<br>OR<br>CD-GRAPHICS |
| 00x0<br>00x1<br>10x0<br>10x1 | CD-ROM TRACK | x IS A REDUNDANCY CODE

FIG. 12

CD-ROM DEVICE CAPABLE OF REPRODUCING BOTH AUDIO DATA AND COMPUTER DATA

BACKGROUND OF THE INVENTION

1. Field of the Invention

The present invention relates to a CD-ROM reproducing apparatus for reading out data recorded on the surface of a compact disk (CD), and particularly to a CD-ROM reproducing apparatus of the type which can be connected to an external computer system and used, and which can read out both computer data (CD-ROM data) and music data (CD-DA data) on a CD. More particularly, the present invention relates to a CD-ROM reproducing apparatus of the type which can read out computer data even during the reproduction of music data.

2. Description of the Prior Art

With the recent technological improvement, various kinds of personal computers (PC) such as desktop types and notebook types have been developed and sold on the market. These computer systems have a CPU and a memory as essential components, and also, as a standard or optional feature, a non-volatile external storage device in order to record and store a large capacity of program or data. The external storage device is, for example, a FDD (Floppy Disk Drive), a HDD (Hard Disk Drive), a CD-ROM (Compact Disk-Read Only Memory) drive, or the like. For example, in the case of an "IBM Thinkpad 560" ("Thinkpad" is a trademark of IBM Corporation) marketed by IBM Japan Corporation, not only a HDD is normally provided, but also an external FDD can be optionally connected to a FDD port located in the rear part of a PC main body, or an external CD-ROM drive can be optionally connected via a PC card (IDE card) (see FIG. 1). An example of the external CD-ROM drive is "CD-400" marketed by IBM Japan Inc.

Since the CD (compact disk) can record a large capacity with high density, it is mainly applied to recording enormously large information. Especially recently, a CD-ROM drive has been rapidly popularized, since the CD-ROM has been compact and its access time has been decreased as well as since software distribution by means of the CD-ROM has been usually effected as a result of operating system (OS) or applications being enlarged.

The CD is an information storage medium which comprises a disk made of a transparent resin as a substrate, on one surface of which pits corresponding to digital data (protruding and recessed forms with different reflectance) are spirally formed with the same density, an extremely thin metal film such as aluminum is fixed thereon, and a hard protective film is further formed on its upper layer. Then, the CD-ROM drive (CD-ROM reproducing apparatus) for reproducing data stored on the disk reads out the data by emitting laser light on the rotating disk and using the change of the intensity of reflected light. A scanning operation on the disk surface is usually carried out in accordance with a constant linear velocity (CLV) method. The scanning velocity is defined based on a "standard speed" which is equivalent to the speed of reading out and reproducing audio data. Recently, a CD-ROM drive capable of reading out the data at two times speed, four times speed, and further, eight times speed has also made an appearance.

Physical and logical specifications of a CD were proposed mainly by Sony Inc. and Philiphis Corp. and the specific contents thereof were described in a so-called "Red Book", "Yellow Book", "Green Book", and the like.

Data is basically recorded in a spiral manner on the CD from a part near the center of a disk surface to its outer periphery with the same density (see FIG. 9(a)). The physical format of the data on the CD comprises three areas of a Lead In area, a program area, and a Lead Out area in the direction from its inside to its outside. The area enclosed between Lead In and Lead Out is called a "session". A multi-session type CD has a plurality of program areas which are separated from the Lead In area and Lead Out area.

The Lead In and Lead Out areas are provided for defining a program area, and recording the attribute information of the disk or various kinds of control information such as the start position of each track in the program area. The program area is an area in which the substantial user data such as computer data or audio data is stored and comprises one or a plurality of tracks. A track can be further divided into sectors having the length of 2K byte. Each track has a variable length (Namely, the number of sectors in one track is not constant) and its length depends on the length of user data to be stored. For example, in the case of music CD, one track corresponds to one tune and the number of sectors in the track corresponds to the performance time of the tune.

Generally, while computer data is stored in the CD in accordance with a "CD-ROM format", audio data is stored in accordance with a "CD-DA format" (track of the CD-ROM format is referred to as a "CD-ROM track", and a track of the CD-DA format is referred to as a "CD-DA track", hereinafter). As one kind of the CD-DA format, there is a "CD-Graphics" format in which image data is stored in the free area of the audio data. Additionally, other formats also exist, including a "CD-I (Compact Disk-Interactive media)" format in which image data and audio data are stored in the same track in accordance with a time-division multiplexing of multiple channels) and a "CD-ROM XA" format or the like. Recently, a hybrid type CD, has been also widely employed, in which CD-ROM tracks and CD-DA tracks are mixed in a single CD.

FIG. 9(b) schematically shows the physical format of a CD. As illustrated, one session is formed in such a manner that a program area which stores the substance of user data is sandwiched between a lead in area and a lead out area.

The program area can include up to 99 tracks at maximum. In the case of the CD-DA track, one track corresponds to one tune, and in the case of music CD, the number of tracks corresponds to the number of stored tunes. The length of the track is not constant. For example, as for the CD-DA track, the number of sectors included in one track depends on the performance time of a tune.

Various kinds of control information for a session are recorded in the lead in area and the lead out area. A table for managing attribute information and control information in the session for each track unit, which is called a TOC (Table of Contents), is stored in the lead in area. As shown in FIG. 10(a), among the TOC, a 96 bit length record called a "Q channel" is prepared for each track and the respective Q channels are stored in accordance with the order of corresponding tracks in the program area (In the above figure, a Q channel "$Q_i$" corresponds to a i-th track "$T_i$" from the head).

Each Q channel has a data structure as illustrated in FIG. 10(b). The value stored in each field (namely, Control, ADR . . . ) of a Q channel is a value having a respective meaning when a track is sought or data is read out from the track. For example, A PSec field is used to indicate the type of a disk format. Table 1 shows the relationship between a PSec value and a format type. Specifically, if PSec=00 h, the disk has a CD-DA (herein, including CD-Graphics), CD-ROM track, or a hybrid type of the CD-DA and CD-ROM tracks: if PSec=10 h, the disk has a CD-l format type: if PSec=20 h, the disk has a CD-ROM XA format type. In general, the tracks having different PSec values are not provided on the same disk. See FIG. 11.

Further, the Control field is used for indicating the types of corresponding tracks. FIG. 12 shows the relation between the values of Control and the types of tracks. As understood from the FIG. 12, if a second significant bit of the Control field is 0, the corresponding track is a CD-DA track or CD-Graphics track: if the above mentioned bit is 1, the corresponding track is a CD-ROM track. In other words, by referring to the PSec or the Control of the Q channel, whether the corresponding track is a CD-DA track or not can be identified.

A CD-ROM drive of the type which is internally installed in or externally optionally connected to a personal computer is connected to a CPU via a bus, in a similar manner to other peripheral devices, and receives commands issued from application or an operating system (OS) during a transaction via the bus. The main contents of commands toward the CD-ROM drive are for reading out CD-ROM data, for reproducing; tune-selecting; reproduction-stopping CD-DA data or the like. The exchange of the commands or data between the CD-ROM drive and the computer main body side are usually performed under an I/O transfer method. There are exemplified, as the standards of interface for connecting the CD-ROM to the personal computer, an Enhanced IDE (Integrated Drive Electronics) and SCSI (Small Computer System Interface), etc. There is also a CD-ROM drive of the type which, when audio data is to be reproduced, does not transfer audio data to the computer main body but reproduce audio sound read audio data by using an internal audio data reproducing circuit and a speaker.

CD-DA data is read out from a CD in accordance with the same manner as that of a conventional reproduction of a record. Briefly, the CD-DA data is generally read out at a "standard speed" (about 150 KBps) equal to a sampling frequency in order to reproduce it as a normal sound (that is, the data is reproduced without buffering data). On the other hand, CD-ROM data can be read out at a higher speed under buffering data or the like. A CD-ROM drive of the type, has also made an appearance, which can read out the CD-ROM data at four times speed (4×150=600 KBps), and eight times speed (=8×150=1.2 MBps).

The CD-DA format type is specified in the "Red Book", the CD-ROM format type is specified in the "Yellow Book" and the CD-I format type is in the "Green Book", respectively. The CD-I format is a standard for making an interactive operation possible and the CD-ROM XA format is a standard by which audio data is integrated with motion picture data and the obtained data is processed as multimedia data.

Recently, the needs of a PC user have been varied. For example, one of them resides in that he or she wants to make an access to CD-ROM data with keeping the performance of music CD (namely, continuously processing CD-DA data) in the case that a hybrid CD type is loaded. Especially, the PC main body side can easily perform the processing of reading out the CD-ROM data during the reproduction of the CD-DA data under the control of an operating system (for example, "OS/2" of IBM Corp. ("OS/2" is a trademark of IBM Corp.) or "Windows 95" of Microsoft Corporation) which supports a multitask environment. For example, the PC main body side can supply a "CD-ROM data reading out command" according to another program, while the processing of a previously supplied "audio reproducing command" is not terminated (that is, while the CD-ROM drive is carrying out an audio reproduction process). In other words, the PC main body side can request a "simultaneous reproduction" of audio data and computer data. If an enormously large program is to be installed into the PC main body, the needs for the "simultaneous reproduction" will be particularly large.

As described above, respective data of different data formats are stored in individual tracks (or different sessions) even on a hybrid type CD in which the CD-ROM data (namely, computer data) and the CD-DA data (namely, audio data) are mixed. Therefore, when a CD-ROM data reading out request is sent from the PC side during the reproduction of the audio data, a pick-up head must be moved to a CD-ROM track/session designated by a CD-ROM data read request from a CD-DA track/session which is being accessed at present, in order to execute the CD-ROM data reading out request. As a result of such head seek operation, the CD-ROM drive will have to interrupt the reading out of the CD-DA data and the reproduction of the audio data.

Most of conventional CD-ROM drives are designed to perform single task, so that they have to abort a processing of a prior command in order to perform the next command. Accordingly, when a conventional CD-ROM drive receives a CD-ROM data reading out request during the reproduction or play processing of audio data, the CD-ROM drive inevitably stops a CD-DA data reading out and reproducing operation. Further, since the conventional CD-ROM drive is not designed to automatically resume a command processing which is temporarily subjected to the abort processing, an audio data reproduction processing is not resumed even after the CD-ROM data is completely read out.

The PC main body side under a multitask environment can supply a next command during processing of a previous command. However, the CD-ROM drive only processes commands one by one. In other words, while the "simultaneous reproduction" can be realized on the display screen (desktop) of PC side, the CD-ROM drive cannot perform the "simultaneous reproduction".

Although the reading speed of the computer data has been promoted to increase step by step in such a way as to start from two times speed to, four times speed, eight times speed . . . , the audio data must have been read out at a standard speed equal to a sampling, because the audio data (CD-DA data) has needed to be reproduced as a normal sound at a standard speed. Specifically stated, the high speed type CD-ROM drive has needed to switch a data reading speed between a case where the computer data is read out and a case where the audio data is read out. This problem has been also an factor owing to which the simultaneous reproduction of the computer data/audio data has been prevented from being realized.

SUMMARY OF THE INVENTION

The present invention takes notice of the above mentioned problems, and therefore an object of the invention is to provide an excellent CD-ROM reproducing apparatus for reading out data recorded on the surface of a compact disk (CD) and a method for controlling it.

Another object of the present invention is to provide an excellent CD-ROM reproducing apparatus of the type which is connected to an external computer system and used and can read out both computer data (CD-ROM data) and music data(CD-DA data) on a CD and a method for controlling it.

A further object of the present invention is to provide an excellent CD-ROM reproducing apparatus which can read out computer data even during the reproduction of music data and a method for controlling it.

The present invention was made by taking the above mentioned problems into consideration. According to a first aspect of the invention, there is provided a CD-ROM reproducing apparatus of the type which can be connected to an external computer system and which can reproduce both audio data and computer data on a disk, comprising:

a data read out part for reading out data from the disk at x times speed (herein, x is an integer not smaller than 2);

an audio data buffer for temporarily storing the audio data read out from the disk;

a computer data buffer for temporarily storing the computer data read out from the disk;

an audio data processor for reading out the audio data in the audio data buffer and processing it at a standard speed;

a computer data processor for reading out the computer data in the computer data buffer and processing it;

a control part for controlling the entire operation of the CD-ROM reproducing apparatus; and an interface part for executing interface protocol between the CD-ROM reproducing apparatus and the external computer system.

In the CD-ROM reproducing apparatus according to the first aspect of the invention, the control part may include:

a first controller for having the audio data processor read out the audio data corresponding to a predetermined period T[sec] from the disk at x times speed every predetermined period T[sec], in response to the receipt of an audio reproduction command from the external computer system, and having the audio data processor reproduce the audio data corresponding to the predetermined period T[sec] at a standard speed; and a second controller for having the computer data processor read out the computer data during a remaining period (T−T/x)[sec] after the audio data corresponding to the predetermined period T[sec] at x times speed within a predetermined period T[sec], in response to the receipt, during processing of the audio reproduction command, of a computer data read out command from the external computer system.

Further, the operation of the CD-ROM reproducing apparatus according to the first aspect of the invention may be controlled in accordance with a control program comprising the steps of:

reading out audio data corresponding to a predetermined period T[sec] from the disk at x times speed every predetermined period T[sec], in response to the receipt of an audio reproduction command from the external computer system, and storing the audio data in the audio data buffer;

reproducing the audio data corresponding to the predetermined period T[sec] stored in the audio data buffer at a standard speed; and reading out computer data during a remaining period (T−T/x) [sec] after the audio data corresponding to the predetermined period T[sec] is read out at x times speed within the predetermined period T[sec], in response to the receipt, during processing of an audio reproduction command, of a computer read out command from the external computer system.

According to a second aspect of the invention, there is provided a CD-ROM reproducing apparatus of the type which can be connected to an external computer system and which can reproduce both audio data and computer data on a disk, comprising:

an interface part for executing an interface protocol between the CD-ROM reproducing apparatus and the external computer system;

a data read out part for reading out data from the disk at x times speed (herein, x is an integer not smaller than 2), having;

a device for reading out audio data corresponding to a predetermined period T[sec] from the disk at x times speed every predetermined period T[sec], in response to the receipt of an audio reproduction command from the external computer system; and a device for reading out computer data from the disk during a remaining period (T−T/x)[sec] after the audio data corresponding to the predetermined period T[sec] is read out within the predetermined period T[sec], in response to the receipt, during processing of the audio reproduction command, of a computer data read out command from the external computer system;

an audio data buffer for temporarily storing the audio data read out from the disk;

a computer data buffer for temporarily storing the computer data read out from the disk;

an audio data processor for reading out the audio data corresponding to the predetermined period T[sec] in the audio data buffer and processing it at a standard speed;

a computer data processor for reading out the computer data in the computer data buffer and processing it; and a control part for controlling the entire operation of the CD-ROM reproducing apparatus.

According to a third aspect of the invention, there is provided a CD-ROM reproducing apparatus of the type which can be connected to an external computer system and which can reproduce both audio data and computer data on a disk, comprising:

a data read out part for reading out data from the disk at x times speed (herein, x is an integer not smaller than 2);

a buffer for temporarily storing the data read out from the disk;

a buffer control part for allocating regions in which the audio data and the computer data are respectively stored in the buffer;

an audio data processor for reading out the audio data in the buffer and processing it at a standard speed;

a computer data processor for reading out the computer data in the buffer and processing it;

a control part for controlling the entire operation of the CD-ROM reproducing apparatus; and an interface part for executing interface protocol between the CD-ROM reproducing apparatus and the external computer system.

In the CD-ROM reproducing apparatus according to the third aspect of the invention, the control part may include:

a first controller for having the audio data processor read out the audio data corresponding to a predetermined period T[sec] from the disk at x times speed every predetermined period T[sec], in response to the receipt of an audio reproduction command from the external computer system, and having the audio data processor reproduce the audio data corresponding to the predetermine period T[sec] at a standard speed;

a second controller for having the computer data processor read out the computer data during a remaining period (T−T/x)[sec] after the audio data corresponding to the predetermined period T[sec] is read out at x times speed within the predetermined period T[sec], in response to the receipt, during processing of the audio reproduction command, of a computer data read out command from the external computer system; and a third controller for allocating an audio data region of a space sufficient to store the audio data corresponding to the predetermined period T[sec] in the buffer.

Further, the operation of the CD-ROM reproducing apparatus according to the third aspect of the invention may be controlled in accordance with a control program comprising the steps of:

reading out audio data corresponding to a predetermined period T[sec] from the disk at x times speed every predetermined period T[sec], in response to the receipt of an audio reproduction command from the external computer system, and storing the audio data in the region of the buffer to which the audio data is assigned;

reproducing the audio data corresponding to the predetermined period T[sec] stored in the buffer at a standard speed;

reading out computer data during a remaining period (T−T/x) [sec] after the audio data corresponding to the predetermined period T[sec] is read out at x times speed within the predetermined period T[sec], in response to the receipt, during processing of the audio reproduction command, of a computer read out command from the external computer system; and allocating the audio data region of a space sufficient for the audio data corresponding to the prescribed period T[sec] to be stored in the buffer.

Further, according to a fourth aspect of the invention, there is provided a CD-ROM reproducing apparatus of the type which can be connected to an external computer system and which can reproduce both audio data and computer data on a disk, comprising:

an interface part for executing an interface protocol between the CD-ROM reproducing apparatus and the external computer system;

a data read out part for reading out data from the disk at x times speed (herein, x is an integer not smaller than 2), having;

a device for reading out the audio data corresponding to a predetermined period T[sec] from the disk at x times speed every predetermined period T[sec], in response to the receipt of an audio reproduction command from the external computer system; and a device for reading out computer data from the disk during a remaining period (T−t/x)[sec] after the audio data corresponding to the predetermined period T[sec] is read out within the predetermined period T[sec], in response to the receipt, during processing of the audio data reproduction command, of a computer data read out command from the external computer system;

a buffer for temporarily storing respectively the audio data and computer data read out from the disk;

a buffer control part for assigning regions in which the audio data and computer data are respectively stored to the buffer;

an audio data processor for reading out the audio data corresponding to the predetermined period T[sec] in the buffer and processing it at a standard speed;

a computer data processor for reading out the computer data in the buffer and processing it; and a control part for controlling the entire operation of the CD-ROM reproducing apparatus.

It is assumed that the CD-ROM reproducing apparatus according the respective aspects of the present invention is the type which is connected to an external computer system and which reads out data from a CD at x times a standard speed (herein, x is an integer not smaller than 2). Further, the CD-ROM reproducing apparatus is provided with an audio data buffer for temporarily storing audio data read out from a disk and a computer data buffer for temporarily storing computer data read out from the disk. In this case, the respective buffer memories may be similarly memory chips independent of the other or may be assigned as respective segment areas on a shared memory.

For example, when the CD-ROM reproducing apparatus receives an audio data reproduction or play command from the external computer system, the CD-ROM reproducing apparatus reads out the CD-DA data corresponding to a predetermined period T[sec] from the disk at a speed x times as high as a standard speed every predetermined period T[sec] and stores the CD-DA data in the audio data buffer. Then, the CD-ROM reproducing apparatus reproduces the audio data from the audio data buffer at a standard speed equal to a sampling frequency. Since the reading out processing of the audio data corresponding to the predetermined period T[sec] from the disk is finished in T/x [sec], the data read out part is brought into a stand-by state during a remaining period (T−T/x)[sec].

On the other hand, when the CD-ROM reproducing apparatus receives a computer data read out command from the external computer system, during the reproduction processing of the audio data, the CD-ROM reproducing apparatus attempts to move a pick-up head to a requested CD-ROM track and read out the computer data by using a waiting time or latency time (T−T/x)[sec] for reading out the audio data.

When the CD-ROM reproducing apparatus is driven, for example, at ten times speed (namely, a data reading out speed is 1.5 MBps), and performs an audio data reproduction processing every cycle of 600 msec (namely, T=600 msec), the time of T−T/x=540[msec] can be used for reading out the computer data. Since the seek time of the pick-up head is approximately 200 msec on an average, an actual time which can be taken for reading out the computer data is 140 (=540−200×2) [msec] obtained by subtracting a time required for moving the pick-up head to a computer data track to an audio data track and returning it to the audio data track from the remaining time (540[msec]). Since the CD-ROM reproducing apparatus is driven at ten times speed, namely, at the speed of 1.5 MBps, it can read out the computer data of 210K byte (=1.5 MBps×140 msec) at the highest during the predetermined period T (=600 [msec]). In the meantime, a read out command from the PC main body side requests the data not larger than the buffer size (ordinary, around 64 bytes) of a single read out command issuing program (ordinary, a file system in an OS) to be transferred for every reading out operation. Accordingly, the requested computer data can be completely transferred by using the waiting time (T−T/x)[sec].

Then, when the predetermined period T[sec] has elapsed, the pick-up head returns again to the audio data track and reads out audio data corresponding to a next predetermined period T[sec] at x times speed from the disk. If the computer data which is requested to be read out still remains, the computer data is to be read out again by employing a next waiting time (T−T/x) [sec]. The above mentioned processings are repeated until the audio data reproduction is completed or the computer data read out is completed.

In other words, the CD-ROM reproducing apparatus according to the present invention attempts to read out the CD-ROM data using an interval for an audio data reproduction processing without interrupting the audio data reproduction processing because of a command received afterward.

Thus, according to the present invention, an excellent CD-ROM reproducing apparatus of the type which can read out computer data even during the reproduction or play of music data and a method for controlling it can be provided.

In this context, "audio data" and "computer data" are respectively recorded on their tracks on the CD-ROM in accordance with a CD-DA format and a CD-ROM format. Additionally, when the term "audio data reproduction processing" is referred to in this specification, it is assumed that the term means both reading out of the audio data from the disk/writing it on a data buffer and reading out of the audio data from the data buffer/outputting of the audio data.

Still further objects, features or advantages of the present invention will be understood from the more detailed description based on the embodiments of the present invention or accompanying drawings as will be described later.

BRIEF DESCRIPTION OF THE DRAWINGS

FIG. 5 is a graph showing the reading out/reproducing CD-DA data of a CD-ROM drive 26;

FIG. 11 shows a table for disk types; and

FIG. 12 shows a table for track types.

DESCRIPTION OF THE PREFERRED EMBODIMENTS

Referring to the accompanying drawings, an embodiment of the present invention will be described in detail hereinafter.

Structure of a Personal Computer

Figure 1:
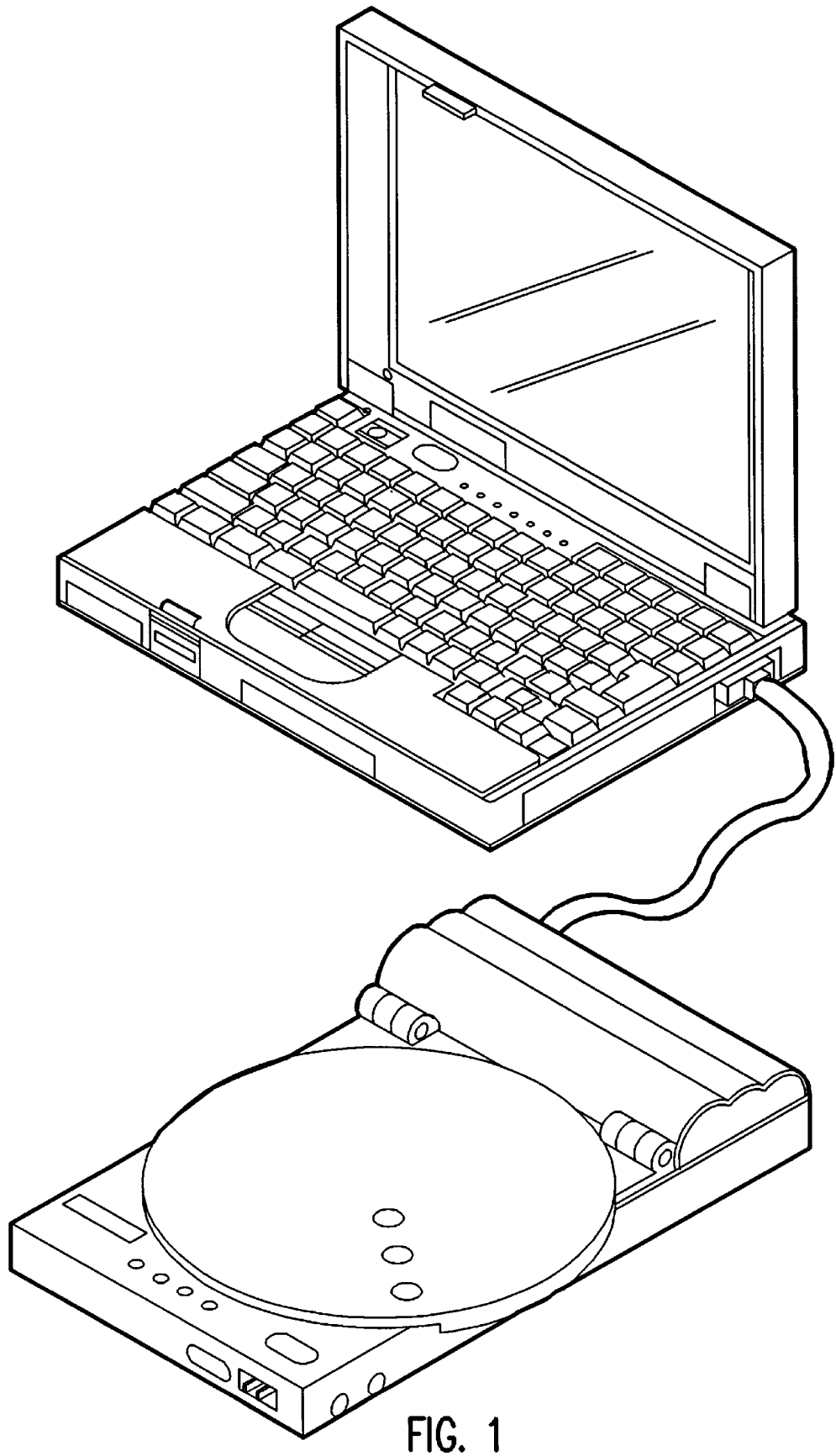
FIG. 1 shows a notebook computer (IBM ThinkPad 560) and an external CD-ROM drive (CD-400) connected thereto.
Figure 2:
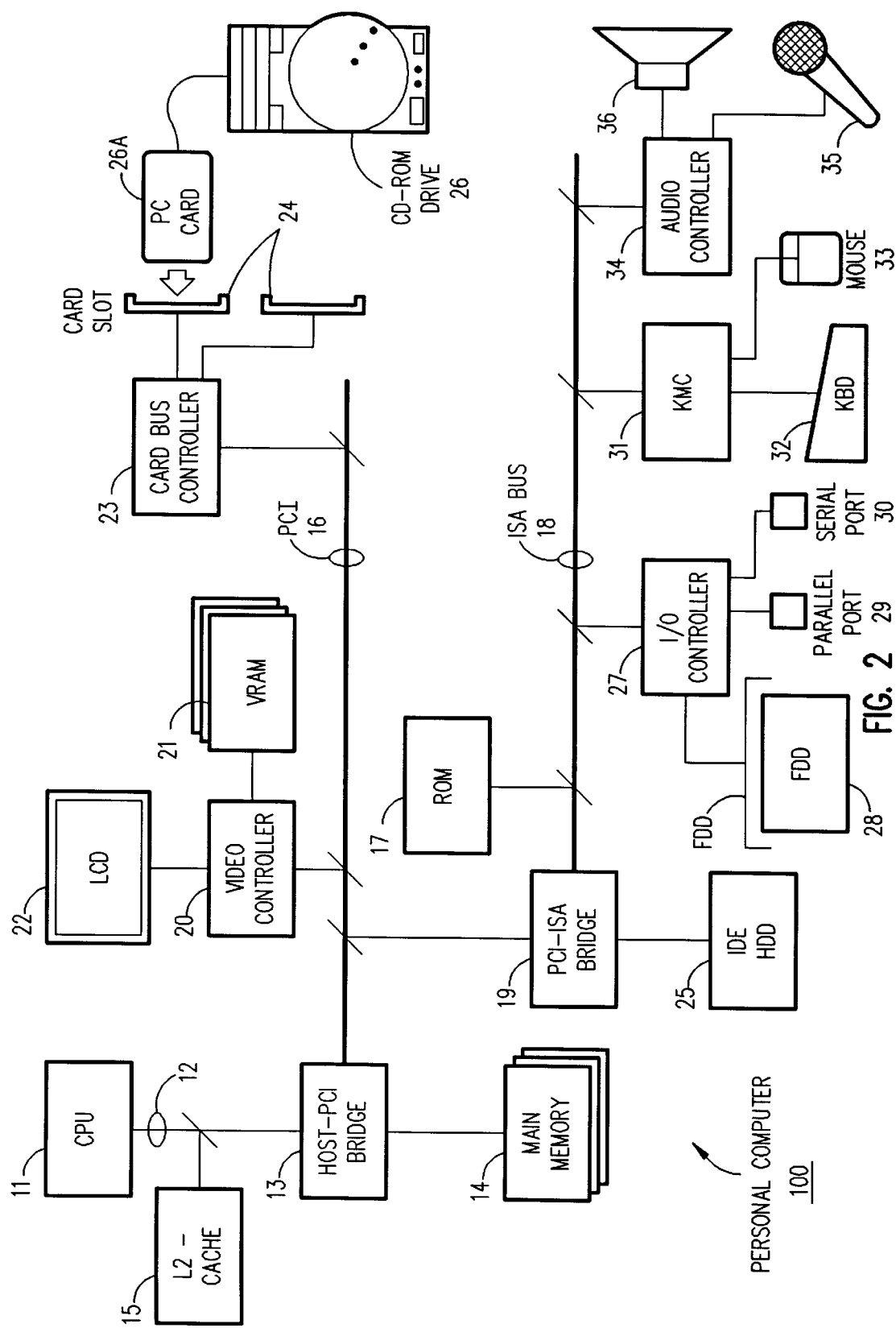
FIG. 2 shows a typical hardware structure of a personal computer (PC) adapted for realizing the present invention.

FIG. 2 schematically shows the structure of a hardware of a personal computer (PC) 100 suitable for realizing the present invention.

A CPU 11, which is a main controller, runs various types of programs under the control of an operating system (OS). The CPU 11 may be, for example, a "Pentium/1xxMHz" manufactured by Intel Corporation. Further, the OS is a basic software for generally managing hardware and software in the PC 100, and includes various kinds of subsystems such as "memory systems" for controlling memory spaces or "file systems" for controlling file access to an external storage device. The OS of the present embodiment may be preferably the type which provides a multitask environment, such as an "OS/2" of IBM Corporation or a "Windows 95" of Microsoft Corporation. The CPU 11 is interconnected to respective peripheral devices (described hereinafter) through three-layer buses including a processor bus 12 directly connected to its outer pin, a PCI (Peripheral Component Interconnect) bus 16 and an ISA (Industry Standard Architecture) bus 18 as an input and output bus 18.

The processor bus 12 is connected to the PCI bus 16 through a bridge circuit (host-PCI bridge) 13. The bridge circuit 13 of the present embodiment includes a memory controller for controlling an access operation to a main memory 14 and a data buffer for absorbing a speed difference between both the buses 12 and 16.

The main memory 14 is composed of a writable memory element such as a DRAM and used as a loading area for each program and an work area for a program which is being run. An L2-cache 15 is used for temporarily storing minimum data/program as required in order to absorb an access time to the main memory 14. A ROM 17 is a non-volatile memory for permanently storing a control code (BIOS:Basic Input/Output System) for operating each peripheral device (video controller 20, a keyboard 32, an HDD25, an FDD28 or the like) and a test program (POST: Power On Self Test) for turning on a power.

The PCI bus 16 is a bus of the type (bus width is 32 bits, an operating frequency is 33 MHz, a maximum data transfer rate is 132 MBps) at a relatively high speed and to which respective peripheral devices driven at high speed such as the video controller 20 or a card bus controller 23.

The video controller 20 is a peripheral controller for actually processing an video instruction from the CPU 11 and is adapted to temporarily write the processed image data on a screen buffer (VRAM) 21, read out the image information from the VRAM 21 and display and output them to a liquid crystal display (LCD) 22.

The card bus controller 23 is a peripheral controller for exchanging bus signals on the PCI bus 16 with a PC card slot 24. For example, a PC card that conforms to the "PC Card Specification 95" defined by PCMCIA (Personal Computer Memory Card International Association)/JEIDA (Japan Electronic Industry Development Association) can be inserted into the card slot 24. There are exemplified various types of the PC cards including a token ring card for LAN connection, an SCSI card connected to an SCSI device, an IDE card connected to an IDE device, as well as a memory card. For example, the PC card can be connected to a CD-ROM drive 26 via an IDE card 26A.

The PCI bus 16 is interconnected to the ISA bus 18 through a bridge circuit (PCI-ISA bridge) 19. The bridge circuit 19 of the present embodiment includes a DMA controller, a programmable interrupt controller (PIC), and a programmable interval timer (PIT).

Further, the bridge circuit 19 of the present embodiment is also provided with an IDE (Integrated Drive Electronics) interface for connecting a IDE hard disk drive (HDD) 25 thereto. An access operation of the HDD 25 or the CD-ROM drive 26 (described above) or the like to an external storage device is generally carried out by the "file system" which is one of the subsystems of the OS.

The two bridge circuits 13 and 19 are specified by the PCI and usually provided in the form of chip sets. An example of the chip sets is a "Triton" marketed by Intel Corporation.

The ISA bus 18 is lower in data transfer performance than the PCI bus 16 (bus width of 16 bits, a maximum data transfer rate of 4 MBps) and is used for connecting respective peripheral devices driven at low speed such as an I/O controller 27, a keyboard/mouse controller (KMC) 31, an audio controller 34 or the like to the CPU 11.

The I/O controller 27 is a peripheral controller for driving a floppy disk drive (FDD) 28, and for controlling a serial or parallel data input and output to the external device (for example, a modem or a printer: not shown). In the present embodiment, the FDD 28 is an external device and optionally connected to an FDD port provided, for example, in the rear surface part of a PC main body.

The keyboard/mouse controller (KMC) 31 is a peripheral controller for fetching an input code via a keyboard 32 and an input coordinate from a pointing device 33 such as an a mouse/track point.

An audio controller 34 is a peripheral controller for handling an audio signal, which serves to fetch the audio signal input from a microphone 35 as computer data, DA convert the audio data or the like and output the audio data from a speaker 36. The audio controller 34 can also output the audio data (CD-DA data) transferred from the CD-ROM drive.

For constructing the computer system 100, many electric circuits or the like other than those shown in FIG. 2 are required. They are well known by one having ordinary skill in the art, and, do not constitute the spirit of the invention, so that they may be omitted in this specification in order to avoid the complicated drawings and simplify the explanation.

Hardware Structure of the CD-ROM Drive

Figure 3:
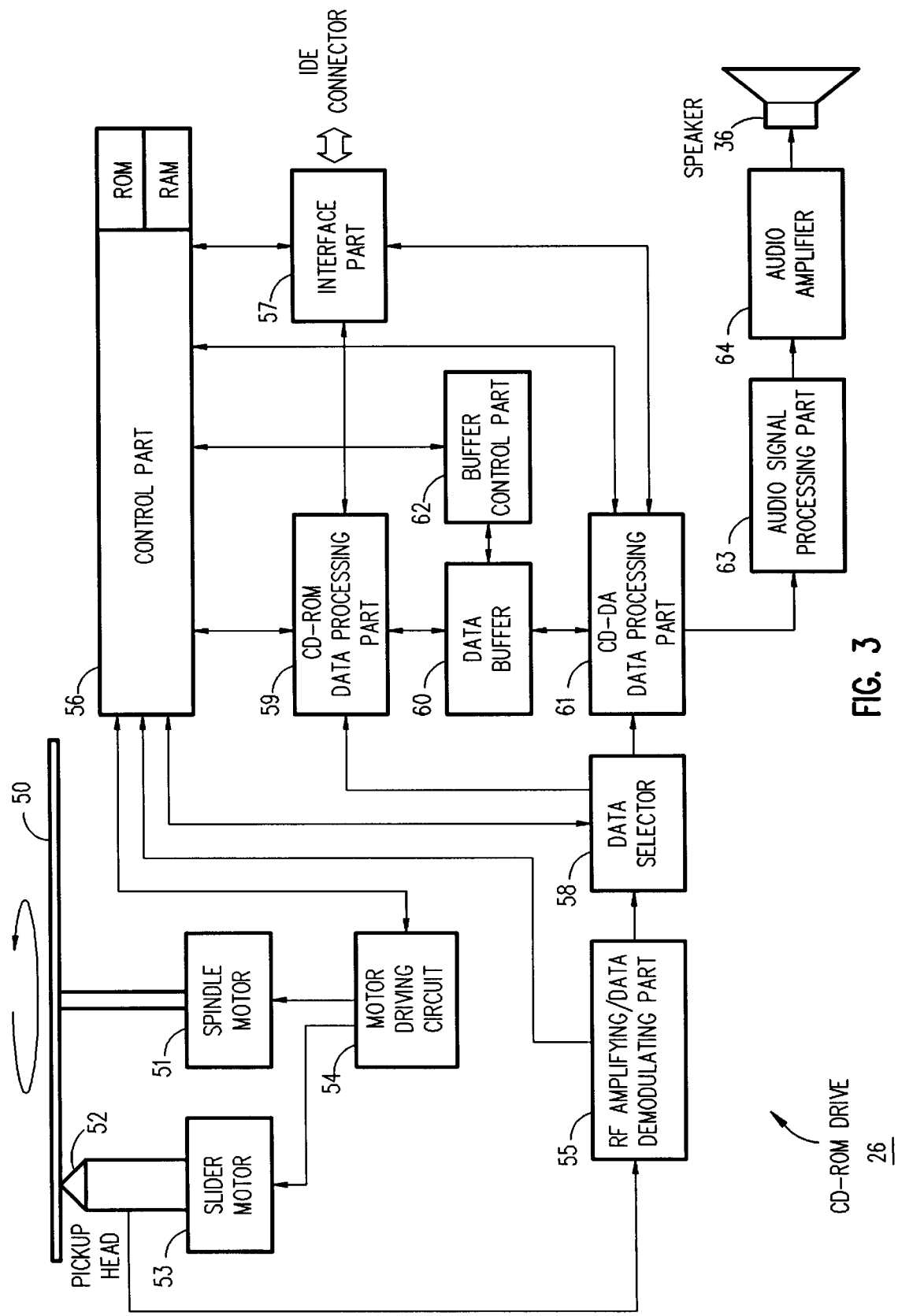
FIG. 3 shows the hardware structure of a CD-ROM drive employed by an embodiment of the present invention.

Now, in this section, the CD-ROM drive 26 used for embodying the present invention will be described in detail. FIG. 3 schematically illustrates the hardware structure of the CD-ROM drive 26. An attention needs to be paid to the fact that the CD-ROM drive 26 is the type which is driven at x times speed.

The CD-ROM drive 26 comprises a control part 56 for controlling the operation of the drive 26 as a whole, an interface part 57 for realizing the exchange of a command or data between the CD-ROM drive 26 and the PC 100, a data read out part for reading out data from a CD 50 as a storage medium, a data processing part for processing the read out data, and an audio data reproducing part for reproducing and outputting the audio data within the drive 26.

The control part 56 serves to control the entire operation of the drive 26 and particularly serves to process a command received from the PC 100 through the interface part 57, to read out data (includes the seek operation of a pick-up head 52) from the CD 50, and to process the read out data. In the control part 56, a ROM in which a control code executed by the control part 56 is permanently stored and a RAM used as a work area are provided.

The interface part 57 is a circuit for exchanging a command or data between the interface part 57 and the PC 100. Its outer pin is directly connected to, for example, the IDE connector of the PC card 26A. The interface part 57 is provided with various kinds of registers for storing a command or data, such as a command register, an address register, a data register, a status register. The CPU 11 within the PC 100 can perform an I/O access to these register groups, so that it supplies a command to the drive 26 or receives read out data from the drive 26 via the register groups. There are enumerated, as commands supplied by the PC 100 side, for example, an "audio reproduction command for requesting for the reproduction of audio data, a "CD-ROM data reading out command for requesting for the reading out of the CD-ROM data. The interface part 57 of the present embodiment conforms to the IDE, however, an interface protocol itself is not limited in embodying the present invention. It will be understood by one having ordinary skill in the art that an interface that conforms the SCSI, not the IDE, can also preferably implement the present invention.

The data read out part comprises a spindle motor 51, a pick-up head 52, a slider motor 53, a motor driving circuit 54 and an RF amplifying/data demodulating part 55.

The CD 50 as the storage medium is rotatably loaded on the spindle motor 51. The pick-up head 52, which is mounted on the slider motor 53 movable in the radial direction of the CD 50, is provided on the lower surface of the CD 50 to receive the reflected light of laser light with which the CD 50 is irradiated so that the data is read out. The motor driving circuit 54 controls the spindle motor 51 and the slider motor 53 so as to rotate a track on the CD 50 at a constant linear velocity (CLV) relative to the pick-up head 52. It is to be well noted that the data read out part of the present embodiment is designed to read out and scan the CD 50 at a speed x times a standard speed (herein, x is an integer not smaller than 2).

An output signal from the pick-up head 52 is input to the RF amplifying/data demodulating part 55 for the respective purposes of head seek operation and processing of read out data. As regards the former purpose, a closed loop control system formed with the control part 56 and the motor driving circuit 54 controls to drive synchronizingly the spindle motor 51 and the slider motor 53 in accordance with the output signal of the pick-up head 52, so that a seek operation of the pick-up head 52 to a designated position on the CD 50 is realized. The pick-up head 52 is supported by a finely movable biaxial device (not shown), so that a focus correction and a tracking correction can be performed. Further, as regards the latter purpose, the output signal of the pick-up head 52 is demodulated by the data demodulating part 55, then, input to a data selector 58, so that a data processing suitable respectively for reading out the CD-ROM data (computer data) and reading out the CD-DA data (audio data) is carried out.

The data processing part comprises the data selector 58, a CD-ROM data processing part 59, a data buffer 60, a CD-DA data processing part 61, and a buffer control part 62.

The data selector 58 outputs a demodulated data input from the RF amplifying/data demodulating part 55 to either of the CD-ROM data processing part 59 and the CD-DA data processing part 61 in accordance with an instruction from the control part 56.

The CD-ROM data processing part 59 acts to write CD-ROM data read out from the CD 50 in accordance with an instruction from the control part 56. That is, the CD-ROM data processing part 59 writes in the data buffer 60 a demodulated CD-ROM data received via the data selector 58 after properly subjecting it to error correction and data extension. After valid CD-ROM data is accumulated in the data buffer 60, it is read out therefrom to be transmitted to the PC 100 via the interface part 57.

The CD-DA data processing part 61 acts to write the CD-DA data in accordance with an instruction from the control part 56. That is, the CD-DA data processing part 61 writes in the data buffer 60 the demodulated CD-DA data received via the data selector 58 after properly subjecting it to error correction and data extension. After valid CD-DA data is accumulated in the data buffer 60, it is read out from the data buffer 60 at the standard sampling speed to be output to the succeeding audio playing part.

The audio playing part comprises an audio signal processing part 63, an audio amplifier 64 and a speaker 65.

The audio signal processing part 63 subjects a CD-DA data input from the CD-DA data processing part 61 to DA (digital-analog) conversion and low-pass filtering to convert it into an audio signal. The converted audio signal is amplified by the audio amplifier 64 and output by the speaker 65 as an audio output. As a result, the CD-DA data read out from the CD 50 at x times speed is output as the real audio sound as the same as a case where the data is read out from the CD 50 at the standard speed. The CD-DA data processing part 61 may transmit the read-out CD-DA data to the PC 100 instead of the audio signal processing part 63 via the interface part 57.

Figure 4:
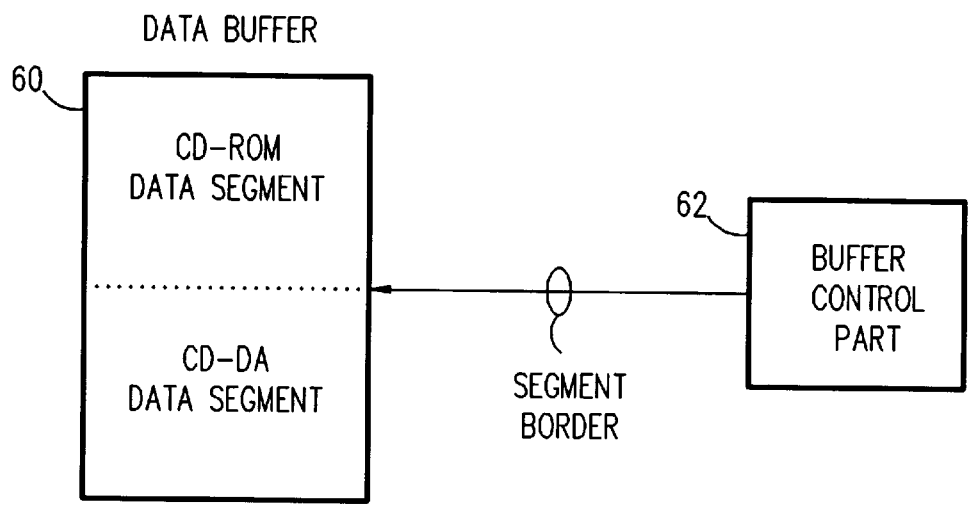
FIG. 4 typically shows segmentation inside a data buffer 60.
Figure 10:
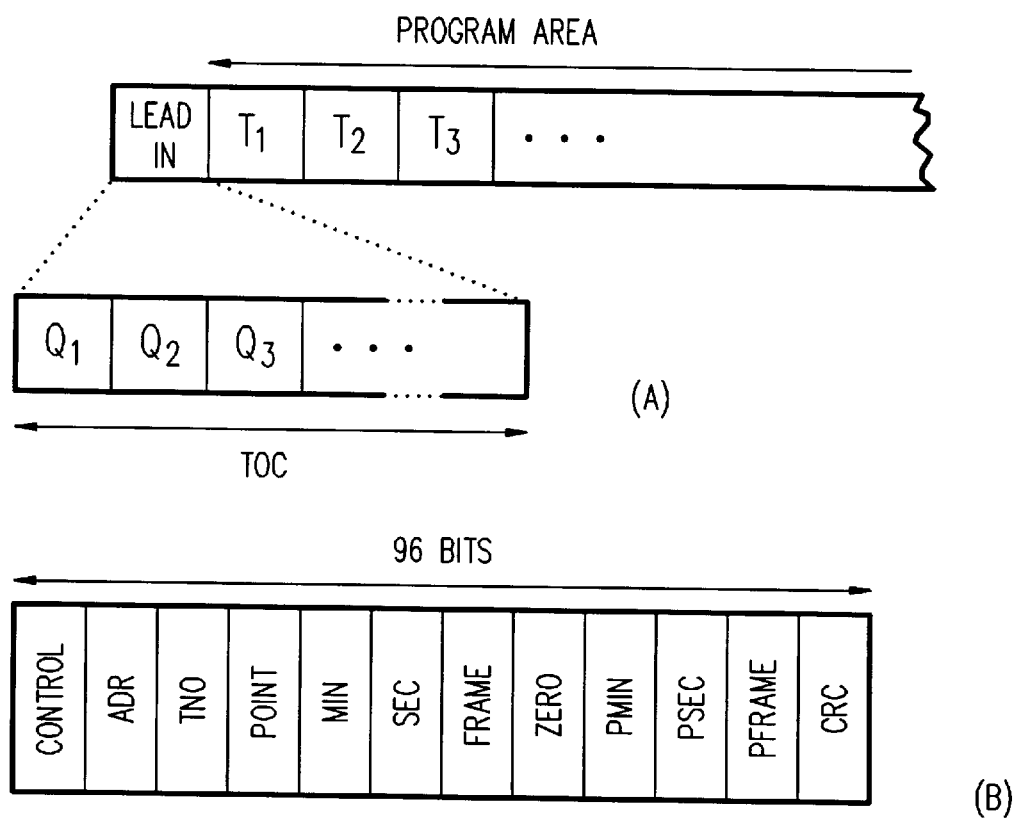
FIG. 10 typically shows the data structure of TOC (Table Of Contents) accommodated in a Lead In area of a CD.

The data buffer 60 may be prepared as respective discrete chips for CD-ROM data and CD-DA data, but this embodiment employs a single buffer memory of about 512K bytes for common use. The data buffer 60, however, is segmented into a CD-ROM data segment and a CD-DA data segment as shown in FIG. 4, and each of the CD-ROM data processing part 59 and CD-DA data processing part 61 is prohibited to access the segment area allocated to the other part. The data buffer 60 is segmented in order to prevent an accident that when a data segment is full of unprocessed valid data, the data is further written in the other data segment over the segment border to break valid data therein without permission.

The position of the segment border is defined by the buffer control part 62 following an instruction from the control part 56. For example, during playing the CD-DA data, 256K bytes may be allocated to each of the CD-ROM data segment and the CD-DA data segment. On the other hand, while the CD-DA data is not played, the whole area of the data buffer 60 may be allocated the CD-ROM data segment. Setting the segment border may be dynamically performed during playing the CD-DA data.

Operation of the CD-ROM Drive

Preceding sections have described the hardware of the PC 100 embodying the present invention and the hardware arrangement of the x times speed type CD-ROM drive 26 which is mountable on the PC 100. This section describes the operation of the system set forth above as well as that of the present invention.

Processing of the Audio Play Command

At first, the operation of the CD-ROM drive 26 in response to an audio play command issued by an audio play program at the PC 100 side will be described in detail.

The CD-DA data is ordinarily stored on a CD track such that reading out at standard speed enables audio play in the originally stored state. That is, data buffering is not necessary for standard speed audio play. In this embodiment, reading out operation is performed, as shown in FIG. 5, at x times speed in order to play the CD-DA data at the standard speed. In the figure, a horizontal axis $t_1$ represents a time axis for reading out CD-DA data from a CD, and a horizontal axis $t_2$ represents a time axis for the audio play of the CD-DA data.

The data read out part of the CD-ROM drive 26 operates in such a way as to read out CD-DA data for a predetermined time T [sec] every predetermined time interval T [sec]. Since the data read out part reads out data at a speed x times as fast as the standard speed, the CD-DA data which requires T [sec] for play at the standard speed is read out from the CD 50 for T/x [sec]. The CD-DA data processing part 61 writes the CD-DA data, which has been read out from the CD 50, in the CD-DA data segment among the data buffer 60 (phase I in FIG. 5).

When the CD-DA data is accumulated in the data buffer 60, the CD-DA data processing part 61 reads out the CD-DA data therefrom and outputs it as an audio output at a speed corresponding to the standard speed (phase I' in FIG. 5). The audio output takes time x times as much as that required for reading out data from the CD, i.e., that is equivalent to the predetermined time T [sec].

Before the data buffer 60 runs out of the CD-DA data, next CD-DA reading cycle starts to begin reading out CD-DA data for next predetermined time T [sec] at x times speed (phase II in FIG. 5).

When the CD-DA data for the next predetermined time T [sec] is accumulated in the data buffer 60, similarly to the case of the phase I', the CD-DA data processing part 61 reads out the CD-DA data from the data buffer 60 and outputs it as an audio output at a speed corresponding to the standard speed (i.e., for the predetermined time T [sec]) (phase II' in FIG. 5). At that time, since the audio output of the CD-DA data for the next predetermined time T [sec] can be started before the data buffer 60 runs out of the CD-DA data previously read out, so that there occurs no discontinuance of audio sound between the phases I' and II'.

Such a reading out and playing operation can finish reading out the CD-DA data, which requires time T at the standard speed, for T/x [sec]. Therefore, for the remaining time (T−T/x) [sec], the data read out part is in a state wherein it need not read out the CD-DA data, that is, in a stand-by state.

Figure 6:
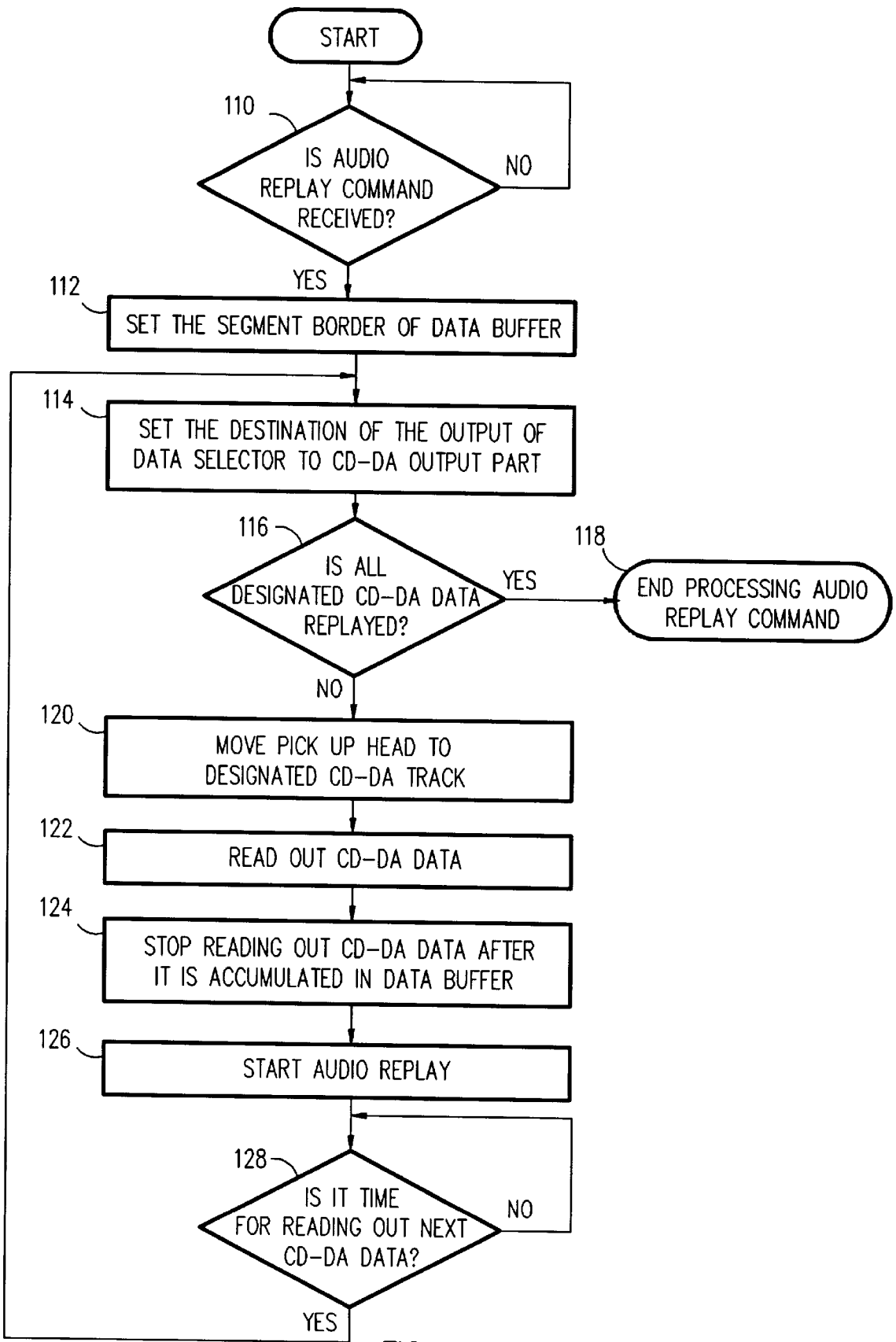
FIG. 6 shows in a flowchart the processing routine of the audio play command of the CD-ROM drive 26.

FIG. 6 shows in the form of a flowchart, the processing routine of an audio play command of the CD-ROM drive 26. The processing routine can be in stored in a ROM integrally provided to the control part 56 as firmware.

The processing routine is started in response to an audio play command supplied from the PC 100 via the interface part 57 (Step 110). The audio play command is issued from an application (audio play program) being run by the CPU 11, and the contents of the command are written in registers in the interface part 57.

The control part 56, which performs the interpretation and processing of the received audio play command, at first defines the segment border of the data buffer 60 to secure the CD-DA data segment (Step 112). This is done against a case wherein the whole area in the data buffer 60 is used by the CD-ROM data segment due to the omission of this step.

Then the control part 56 determines the destination of the output of the data selector 58 to the CD-DA data processing part 61 (Step 114).

Thereafter, the control part 56 determines whether the whole CD-DA data designated by the audio play command have been played or not (Step 116). If played, the procedure goes to branch YES to terminate the process of the audio play command (Step 118).

When there remains CD-DA data to be played, the pickup-head 52 is moved to the designated CD-DA track (Step 120) to read out CD-DA data from the CD (Step 122). Reading out the CD-DA data is performed in a predetermined time T [sec] cycle, wherein data for the predetermined time T [sec] is read out at the x times speed. The audio play command designates a CD-DA track to be played, for example, by designating a tune. The physical position of the CD-DA track, for example, can be found by scanning the corresponding Q channels of Lead In area (see "Background art").

The CD-DA data read out from the CD 50 is temporarily stored in the CD-DA data segment among the data buffer 60 by the CD-DA data processing part 61. When CD-DA data for the predetermined time T [sec] is accumulated in the CD-DA data segment, the reading out operation from the CD 50 is temporarily stopped (Step 124). The CD-DA data for the time T [sec] can be accumulated for T/x [sec]. The data read out part is in a stand-by state until the reading of next CD-DA data after the stop of reading.

Then the CD-DA data processing part 61 starts transmitting the CD-DA data accumulated in the data buffer 60 to the audio signal processing part 63 (Step 126). The audio signal processing part 63 subjects the CD-DA data to DA conversion and low-pass filtering to make it an audio signal. The audio signal is amplified by the audio amplifier 64 to be output by the speaker 65 as an audio sound. Since the data transmission to the audio signal processing part 63 and the subsequent audio play are performed at a speed corresponding to the standard sampling speed, playing the buffered CD-DA data requires T [sec].

At the time for reading out next CD-DA data (Step 128), the procedure returns to Step 114 to read out CD-DA data for next predetermined time T [sec] by the operation similar to that described above. At this time, however, the data buffer 60 need not have run out of the CD-DA data therein, but may be in Step 126 for audio output.

Reading Out CD-ROM Data During Audio Play

The operation of the CD-ROM drive 26 in response to a command for reading out CD-ROM data from the other program during audio play will now be described in detail.

Figure 7:
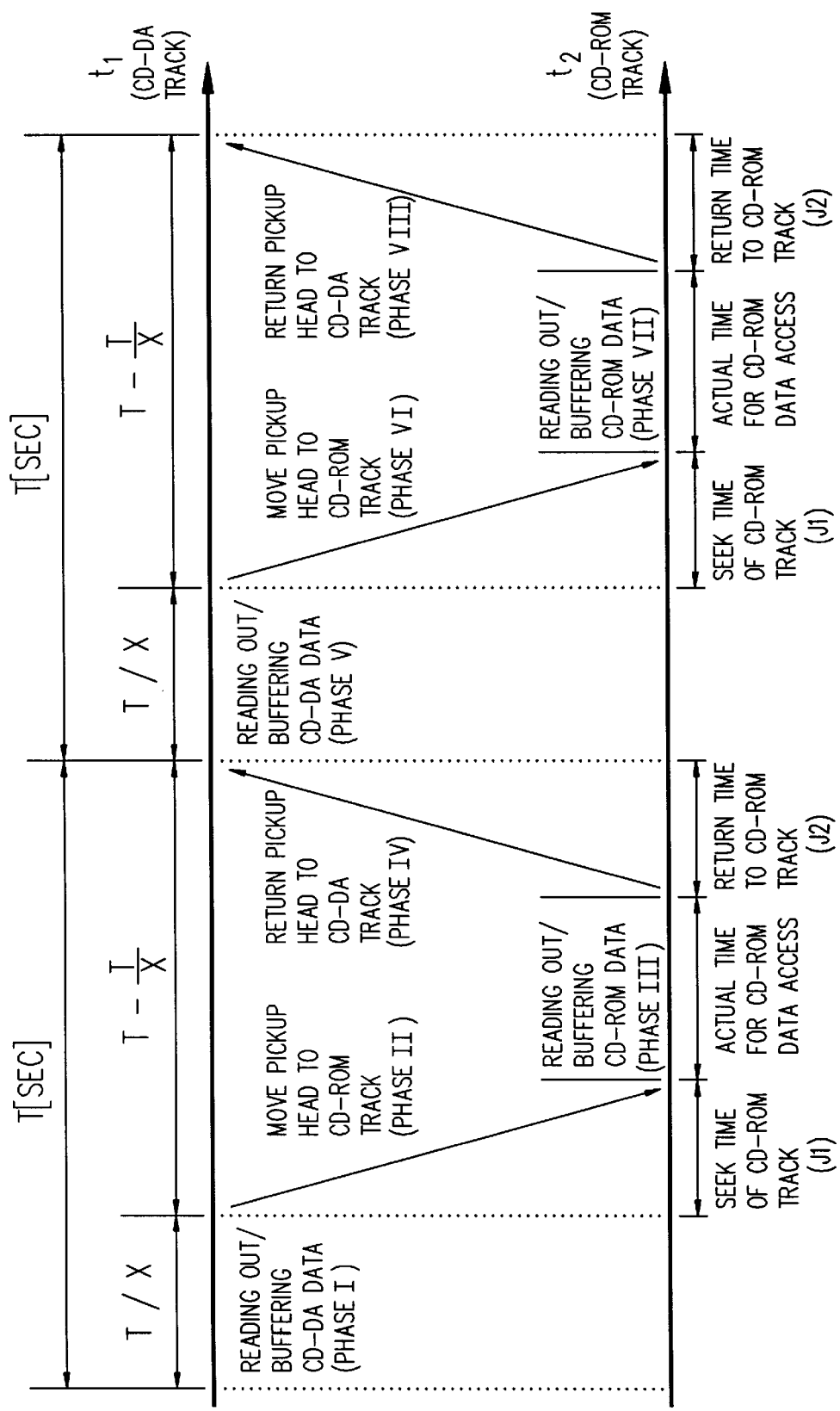
FIG. 7 is a graph showing the concurrent reading out/play operation of CD-DA data and CD-ROM data performed by the CD-ROM drive 26.
Figure 9:
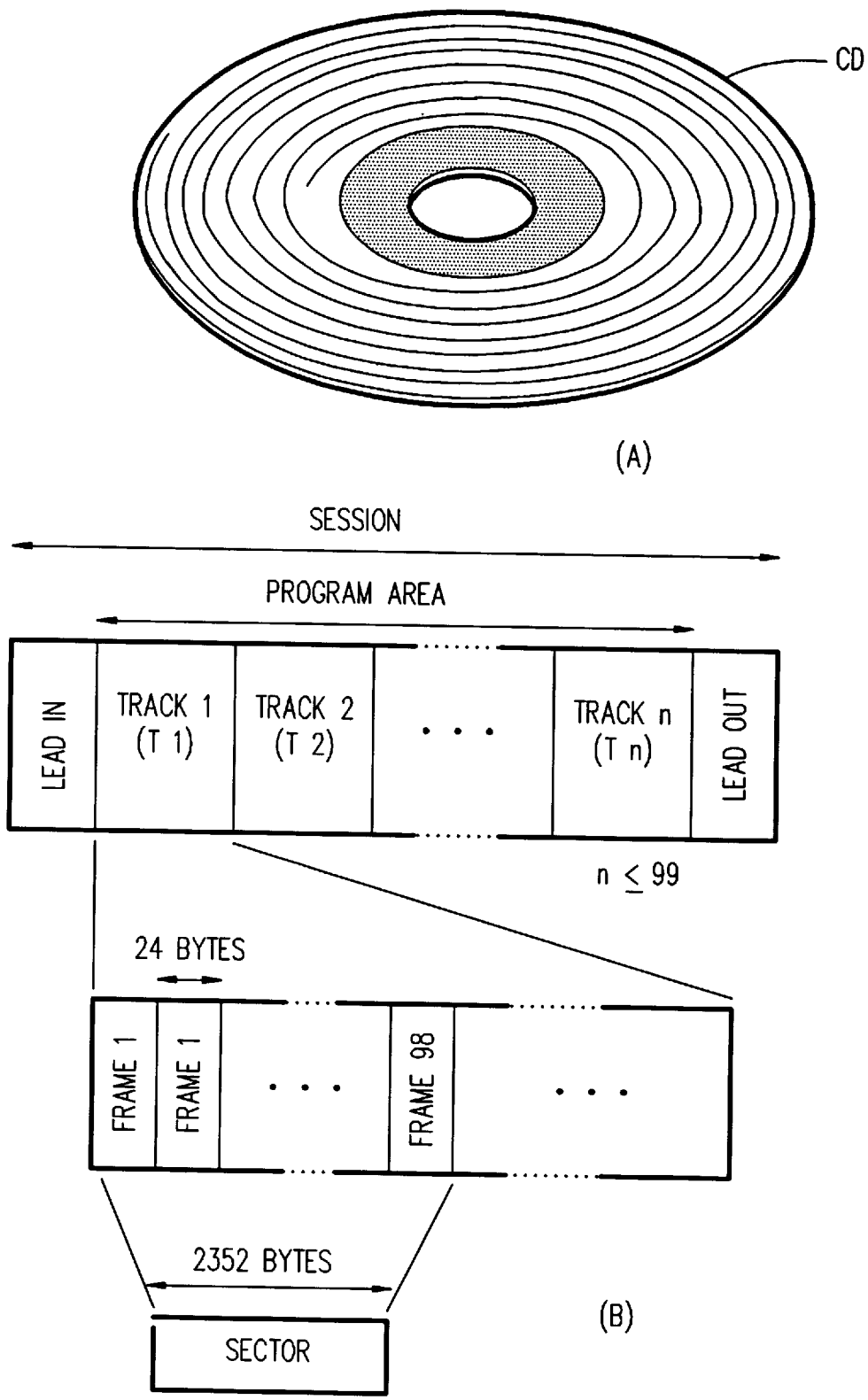
FIG. 9 typically shows a data track on a CD and the physical format of the CD.

As already described with reference to FIG. 9, the CD-ROM drive 26, which reads out CD-DA data in a predetermined time T [sec] cycle at the x times speed, completes reading out CD-DA data from the CD 50 in T/x [sec]. As a result, it is possible to perform a sequence of CD-ROM data transmission that comprises reading out CD-ROM data from the CD 50, buffering the read data, and transmitting the buffered data to the PC 100 within the remaining time (T−T/x) [sec] of each cycle T [sec]. FIG. 7 schematically shows an operation for realizing such concurrent reproduction of CD-DA data and CD-ROM data. In the figure, a horizontal axis $tr_1$ represents scanning on a CD-DA track (or time lapse during scanning), while a horizontal axis $tr_2$ represents scanning on a CD-ROM track (or time lapse during scanning).

As shown in FIG. 7, the CD-ROM drive 26 repeatedly performs in a predetermined time T [sec] cycle the audio play of the CD-DA data, and reading out the CD-DA data and transmitting it to the PC 100.

The data read out part, at first, reads out CD-DA data for a predetermined time T [sec] from a CD-DA track designated by the audio play command, and writes the data in the CD-DA data segment among the data buffer 60 (phase I in FIG. 7). Since data is read out from the CD 50 at a speed x times as fast as the standard speed, reading out/buffering the CD-DA data is finished in T/x [sec]. In case that the CD-ROM drive 26 operates under the condition where T=600 msec and x=10 (double speed), the minimum size of the CD-DA data segment required for buffering the CD-DA data is 90K bytes (=150 KBps×600 msec).

When a request for reading out CD-ROM data is issued from the PC 100, reading out the CD-ROM data is tried within the latency time (T−T/x) [sec] until the start of reading out next CD-DA data. At that time, during the latency time (T−T/x) [sec], it is necessary to move the pickup-head 52 to a designated CD-ROM track (phase II in FIG. 7), read out CD-ROM data therefrom and store it in the CD-ROM data segment among the data buffer 60 (phase III in FIG. 7), and return the pickup-head 52 again to the CD-DA track (phase IV in FIG. 7).

Taking into consideration that the average seek time (moving time $J_1$ and returning time $J_2$) of the pickup-head 52 is 200 [msec], for example, in case of T=600 msec and x=10 (i.e., 10 times speed), 140 msec=(=T−T/x−$J_1$−$J_2$=540 msec−200 msec×2) is a time given for the phase III, i.e. an actual time allowed for reading out the CD-ROM data. The volume of CD-ROM data read out during the time is 210K bytes (=1.5 MBps×140 msec) at maximum. In general, a file system in an OS requests data transfer by increments of 64K bytes that is the buffer size of the file system itself. Therefore, it should be understood that a CD-ROM track access capable of reading out 210K bytes (>64K bytes) is enough for processing a read out command. Consequently, it is preferable that the CD-ROM data segment in the data buffer 60 has a capacity of 210K bytes or more.

During the phases II to IV wherein the CD-ROM track is accessed, the CD-DA data processing part 61 is reading out CD-DA data from the CD-DA segment to output an audio output at a speed corresponding to the standard speed. Before the CD-DA data segment runs out of the CD-DA data, the pickup-head 52 returns to the CD-DA track to start reading out/buffering CD-DA data for next predetermined time T [sec] (phase V in FIG. 7).

On the other hand, when data is accumulated in the CD-ROM data segment as much as the data size (e.g., 64K bytes) designated by the CD-ROM read out command, the CD-ROM data processing part 59 starts transferring the data to the PC 100 side via the interface part 57. When pre-reading the CD-ROM data is necessary, reading out the CD-ROM data from the CD 50 and buffering the CD-ROM data to the CD-ROM data segment may be continuously performed to make full use of the actual read out time (i.e., phase III).

The operation shown in FIG. 7 is repeatedly performed until the execution of the CD-ROM data read out command issued by the PC 100 is completed. For example, in case reading out the CD-ROM data is not completed during phases II to IV, the pickup-head 52 returns to the CD-ROM track again after phase V to execute reading out/buffering the CD-ROM data similarly (phases VI to VIII in FIG. 7). During the phases VI to VIII, it is a matter of course that the play of the CD-DA data is performed concurrently.

In case pre-reading CD-ROM data is necessary even if reading out the same is completed during phases II to IV, reading out/buffering the CD-ROM data may be continued similarly (phases VI to VIII in FIG. 7).

Such operation of reading out/playing the CD-DA data and CD-ROM data enables the concurrent execution of the CD-ROM data read out command issued by the PC 100 while performing the audio play (the CD-DA data is read out from the disk at x times speed while it is played at a speed corresponding to the standard speed). It should be noted well that the CD-ROM drive 26 need not stop the audio play at all to read out the CD-ROM data.

Figure 8:
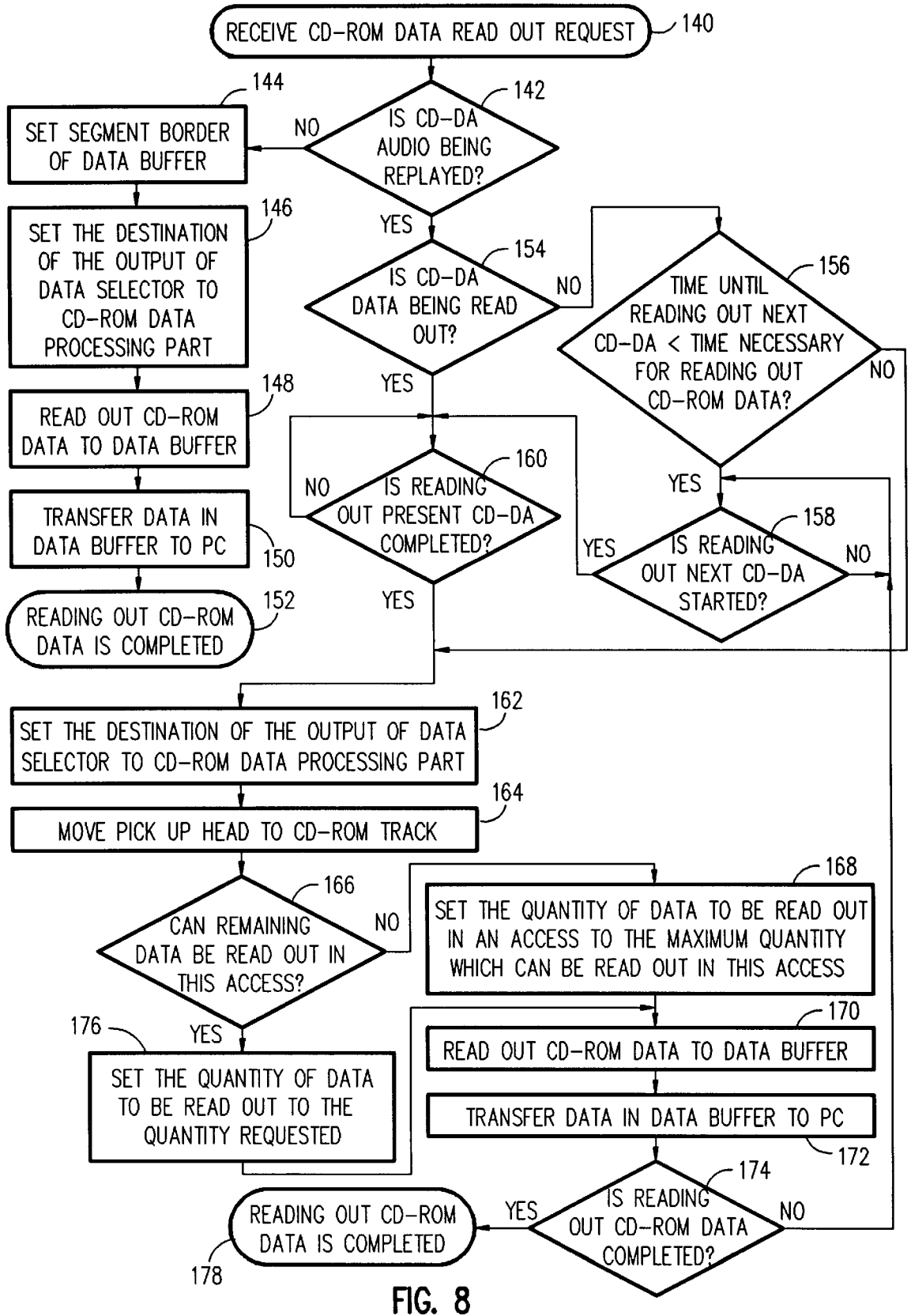
FIG. 8 shows in a flowchart the processing routine of a CD-ROM data read out command during audio play executed by the CD-ROM drive 26.

FIG. 8 shows in a flowchart the processing routine of the CD-ROM data read out command executed by the CD-ROM drive 26 during audio play. The processing routine can be stored, for example, as firmware in a ROM integrally provided to the control part 56.

The processing routine starts in response to a CD-ROM data read out command (tentative name) issued by the PC 100 via the interface part 57 (Step 140). The CD-ROM data read out command is issued, for example, by a file system that is one of OS subsystems, and the actual contents of the command are written in registers in the interface part 57. The quantity of data transfer requested by the file system in a data read out command is usually as much as its buffer size (about 64K bytes) or less.

The control part 56, which interprets and processes the received CD-ROM data read out command, at first determines whether audio play is now being performed or not (i.e., whether the audio play command is being executed or not) (Step 142).

If it is not, reading out the CD-ROM data is performed as follows. In the first place, a segment is set such that the whole area of the data buffer 60 is allocated to the CD-ROM data (Step 144), and the destination of the output of the control part 56 is set to the CD-ROM data processing part 59 (Step 146). Then, the data read out part reads out CD-ROM data from a CD-ROM track designated by the CD-ROM read out command. The CD-ROM data processing part 59 properly subjects the read out CD-ROM data to error correction and data extension and writes it in the CD-ROM data segment among the data buffer 60 (Step 148). When CD-ROM data is accumulated in the data buffer 60, the CD-ROM data processing part 59 reads out the CD-ROM data therefrom to transfer the same to the PC 100 side via the interface part 57 (Step 150). Upon completion of transferring all the requested data, the control part 56 executes the terminate process of the CD-ROM data read out command (152).

On the other hand, if the CD-ROM data read out command is received during audio play, it is determined whether CD-DA data is now being actually read out from the CD 50 or not (i.e., phase I or V in FIG. 7) (Step 154).

If the CD-DA data is not being actually read out from the CD 50, the data read out part is in a stand-by state, so that CD-ROM data can be read out. In this case, a time left until reading out next CD-DA data starts is compared with a time necessary for reading out the CD-ROM data (more strictly, including the seek time of the pickup-head 52 (for moving to the CD-ROM track and returning to the CD-DA track) other than the time for reading out the data) (Step 156). The seek time of the pickup-head 52 can be obtained, for example, by a trial calculation based on the distance between the CD-DA track and the CD-ROM track etc. If there remains enough time for reading out the CD-ROM data, the procedure jumps to Step 162 to read out the CD-ROM data (described later). On the other hand, if there remains no enough time for reading out the CD-ROM data, reading out the CD-ROM data is put off until reading out next CD-DA data is completed and the data read out part is in a stand-by state with regard to the CD-DA data without making use of the present stand-by state of the data read out part (Step 158 and 160).

When the data read out part completes reading out the present CD-DA data (Step 160), the control part 56 tries to read out the CD-ROM data making use of the time left until reading out next CD-DA data starts. For that purpose, at first, the destination of the output of the control part 56 is set to the CD-ROM data processing part 59 (Step 162). Further, the segment border of the data buffer 60 is changed if needs be.

Then the pickup-head 52 is moved to a CD-ROM track designated by the CD-ROM data read out command (Step 164: phase II in FIG. 7).

Thereafter, whether the volume of data requested by the data read out command can be processed within this CD-ROM track access or not is determined (Step 166). Taking into consideration that the volume of data transfer requested by a file system of the OS in a data read out command is 64Kbytes or less, and in case of T=600 [msec] and x=10 (i.e., 10 times speed) the volume of CD-ROM data which can be obtained making use of the latency time of reading out the CD-DA data is about 210K bytes (described above), the result of the decision block is "YES" in a normal design. In case the decision block S66 is "YES", the volume of data requested by the command is determined to be the volume of CD-ROM data to be read out as it is (Step 176). On the other hand, in case the result of the decision block 66 is "NO" because the volume of data requested by the file system is more than expected or the like, the volume of data to be read out is changed to the volume (e.g., 210K bytes or less) which can be obtained in a CD-ROM track access (i.e., phase III or phase VII in FIG. 7) (Step 168).

Successively, the data read out part reads out CD-ROM data from the CD-ROM track. The CD-ROM data processing part 59 properly subjects the CD-ROM data read out from the CD 50 to error correction and data extension and writes the data in the CD-ROM data segment among the data buffer 60 (Step 170).

When CD-ROM data is accumulated in the data buffer 60, the CD-ROM data processing part 59 reads out the CD-ROM data therefrom to transfer it to the PC 100 side via the interface part 57 (Step 172).

When reading out the CD-ROM data requested by the command is completed in the present CD-ROM track access, the control part 56 performs the terminate process of the CD-ROM data read out command (Steps 174 and 178).

On the other hand, if reading out the CD-ROM data requested by the command is not completed in the present CD-ROM track access alone, the procedure returns to Step 158 to repeat steps similar to those described above.

Optimizing Data Buffering

The preceding section described in detail the concurrent reproduction of the CD-DA data and the CD-ROM data. This section describes the optimization of data buffering during the concurrent reproduction.

In general, when the reading time interval T [sec] of the CD-DA data is small, the actual time $(T-T/x-J_1-J_2)$ among a reading cycle T [sec] which is given to a CD-ROM track access becomes short, necessarily the efficiency of reading out CD-ROM data is reduced. To the contrary, when the reading time interval T [sec] is set large, the volume of CD-DA data to be accumulated in a reading cycle is increased. In order to prevent the discontinuance of voice, CD-DA data for the time interval T [sec] has to be buffered with certainty. As a result, the area allocated as the CD-ROM data segment among the data buffer 60 is reduced to necessarily reduce the pre-read volume of the CD-ROM data, so that the efficiency of reading out the CD-ROM data is reduced too.

The time interval T [sec] for reading out the CD-DA data needs to be set according to the following factors.

In case the volume of CD-ROM data to be read out requested by the PC 100 is large, the time interval T [sec] for reading out the CD-DA data shall be increased to lengthen a time $(T-T/x-J_1-J_2)$ for reading out CD-ROM data per access. In addition, the CD-ROM data buffer shall be sufficiently allocated according to the data read out time.

In case a CD-ROM track requested to be accessed by the PC 100 is separated in distance from a CD-DA track which is now being played so that the seek time $(J_1, J_2)$ of the pickup-head 52 is increased, it is necessary to increase the read out time interval T [sec] of the CD-DA data in order to secure the CD-ROM data read out time $(T-T/x-J_1-J_2)$ per access. In this case, however, the CD-ROM data buffer area need not necessarily be increased.

The position of the segment border in the data buffer 60, that is, memory sizes to be allocated for buffering the CD-DA data and the CD-ROM data should be set to be optimal based on which factor of (1) and (2) set forth above the reading out cycle T [sec] is determined.

The setting of the segment border may be dynamically performed during the CD-DA data play.

The present invention has been described in detail with reference to particular embodiments. However, it is obvious that one having ordinary skill in the art can modify the embodiments or provide a substitute for the embodiments without departing the spirit and scope thereof. That is, the present invention has been exemplified and it should not be interpreted to be limited thereto. The scope of claims for a patent described at the beginning of the specification should be referred to in order to understand the spirit and scope of the present invention.

As described above in detail, according to the present invention, it is possible to provide an excellent CD-ROM reproducing apparatus capable of reading out both of computer data (CD-ROM data) and music data (CD-DA data) on a CD, for use with an external computer system connected thereto and a method for controlling the apparatus.

Also according to the present invention, it is possible to provide an excellent CD-ROM reproducing apparatus capable of reading out computer data even during playing music data, for use with an external computer system connected thereto and a method for controlling the apparatus.

We claim:

1. A CD-ROM apparatus of the type which is connected to an external computer system and which reproduces both audio data and computer data from a disk, comprising:

a data read out part for reading out data from the disk at a data sampling speed equal to S times X, where S is a data sampling speed sufficient to produce audio sound and X is an integer not smaller than 2;

an audio data buffer for temporarily storing the audio data read out from the disk;

a computer data buffer for temporarily storing the computer data read out from the disk;

an audio data processor for reading out the audio data in said audio data buffer and processing it at the data sampling speed S;

a computer data processor for reading out the computer data in said computer data buffer and processing it;

a control part for controlling the entire operation of said CD-ROM apparatus, including a first controller for having said audio data processor read out the audio data corresponding to a predetermined period T from the disk at a data sampling speed equal to S times X every predetermined period T, in response to the receipt of an audio reproduction command from said external computer system, and having said audio data processor reproduce the audio data corresponding to the predetermined period T at the data sampling speed S, and a second controller for having said computer data processor read out the computer data during a remaining period T−T/X after the audio data corresponding to the predetermined period T at a data sampling speed equal to S times X within a predetermined period T, in response to the receipt, during processing of the audio data reproduction command, of a computer data read out command from said external computer system; and an interface part for executing interface protocol between the CD-ROM apparatus and said external computer system.

2. A CD-ROM apparatus of the type which is connected to an external computer system and which reproduces both audio data and computer data from a disk, comprising:

an interface part for executing an interface protocol between the CD-ROM apparatus and said external computer system;

a data read out part for reading out data from the disk at a data sampling speed equal to S times X, where S is a data sampling speed sufficient to produce audio sound and X is an integer not smaller than 2, having a device for reading out audio data corresponding to a predetermined period T from the disk at a data sampling speed of S times X every predetermined period T, in response to the receipt of an audio reproduction command from said external computer system, and a device for reading out computer data from the disk during a remaining period T−T/X after the audio data corresponding to the predetermined period T is read out within the predetermined period T, in response to the receipt, during processing of the audio data reproduction command, of a computer data read out command from said external computer system;

an audio data buffer for temporarily storing the audio data read out from the disk;

a computer data buffer for temporarily storing the computer data read out from the disk;

an audio data processor for reading out the audio data corresponding to the predetermined period T in said audio data buffer and processing it at the data sampling speed S;

a computer data processor for reading out the computer data in said computer data buffer and processing it; and a control part for controlling the entire operation of said CD-ROM apparatus.

3. A CD-ROM apparatus of the type which is connected to an external computer system and which reproduces both audio data and computer data from a disk, comprising:

a data read out part for reading out data from the disk at a data sampling speed equal to S times X, where S is a data sampling speed sufficient to produce audio sound, and X is an integer not smaller than 2;

a buffer for temporarily storing the data read out from the disk;

a buffer control part for allocating regions in which the audio data and the computer data are respectively stored in said buffer;

an audio data processor for reading out the audio data in said buffer, and processing it at the data sampling speed S;

a computer data processor for reading out the computer data in said buffer and processing it;

a control part for controlling the entire operation of said CD-ROM apparatus, including a first controller for having said audio data processor read out the audio data corresponding to a predetermined period T from the disk at a data sampling speed equal to S times X every predetermined period T, in response to the receipt of an audio reproduction command from said external computer system, and having said audio data processor reproduce the audio data corresponding to the predetermined period T at a data sampling speed S, and a second controller for having said computer data processor read out the computer data during a remaining period equal to T−T/X after the audio data corresponding to the predetermined period T at a data sampling speed equal to S times X within the predetermined period T, in response to the receipt, during processing of the audio reproduction command, of a computer data read out command from said external computer system, and a third controller for allocating an audio data region of a space sufficient to store the audio data corresponding to the predetermined period T in said buffer;

an interface part for executing interface protocol between the CD-ROM apparatus and said external computer system.

4. A CD-ROM apparatus of the type which is connected to an external computer system and which reproduces both audio data and computer data from a disk, comprising:

an interface part for executing an interface protocol between the CD-ROM apparatus and said external computer system;

a data read out part for reading out data from the disk at a data sampling speed equal to S times X, where S is a data sampling speed sufficient to produce audio sound and X is an integer not smaller than 2, having a device for reading out the audio data corresponding to a predetermined period T from the disk at a data sampling speed equal to S times X every predetermined period T, in response to the receipt of an audio reproduction command from said external computer system, and a device for reading out computer data from the disk during a remaining period T−T/X after the audio data corresponding to the predetermined period T is read out within the predetermined period T, in response to the receipt, during processing of the audio reproduction command, of a computer data read out command from said external computer system;

a buffer for temporarily storing respectively the audio data and computer data read out from the disk;

a buffer control part for assigning regions in which the audio data and computer data are respectively stored in said buffer;

an audio data processor for reading out the audio data corresponding to the predetermined period T in said buffer and processing it at the data sampling speed S;

a computer data processor for reading out the computer data in said buffer and processing it; and a control part for controlling the entire operation of said CD-ROM apparatus.

5. A method for controlling a CD-ROM apparatus, said method comprising the steps of:

reading out audio data corresponding to a predetermined period T from the disk at a data sampling speed equal to S times X where S is data sampling speed sufficient to produce audio sound and X is an integer not smaller than 2, every predetermined period T, in response to the receipt of an audio reproduction command from an external computer system and storing the audio data in an audio data buffer;

reproducing the audio data corresponding to the predetermined period T stored in said audio data buffer at the data sampling speed S; and reading out computer data during a remaining period T−T/X after the audio data corresponding to the predetermined period T is read out at a data sampling speed of S times X, within the predetermined period T, in response to receipt, during processing of an audio reproduction command, of a computer read out command from said external computer system.

6. A method for controlling a CD-ROM apparatus, said method comprising the steps of:

reading out audio data corresponding to a predetermined period T from the disk at a data sampling speed equal to S times X, where S is a data sampling speed sufficient to produce audio sound and X is an integer not smaller than 2, every predetermined period T, in response to the receipt of an audio reproduction command from an external computer system and storing the audio data in a region of a buffer to which the audio data is assigned;

reproducing the audio data corresponding to the predetermined period T stored in said buffer at the data sampling speed S;

reading out computer data during a remaining period T−T/X after the audio data corresponding to the predetermined period T is read out at a data sampling speed equal to S times X within the predetermined period T, in response to the receipt, during processing the audio reproduction command, of a computer read out command from said external computer system; and allocating the audio data region of a space sufficient for the audio data corresponding to the predetermined period T to be stored in said buffer.

* * * * *